(12) United States Patent
Lee et al.

(10) Patent No.: US 11,105,238 B2
(45) Date of Patent: Aug. 31, 2021

(54) DEVICE FOR SCREENING $NO_X$ SENSOR

(71) Applicants: Hyundai Motor Company, Seoul (KR); Kia Motors Corporation, Seoul (KR)

(72) Inventors: Hyun-No Lee, Cheonan-si (KR); Dong-Lim Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/918,326

(22) Filed: Jul. 1, 2020

(65) Prior Publication Data

US 2021/0172357 A1 Jun. 10, 2021

(30) Foreign Application Priority Data

Dec. 6, 2019 (KR) .................. 10-2019-0161436

(51) Int. Cl.
*F01N 3/00* (2006.01)
*F01N 3/08* (2006.01)
*F01N 11/00* (2006.01)
*F01N 13/00* (2010.01)
*B01D 46/00* (2006.01)

(52) U.S. Cl.
CPC ....... *F01N 3/0842* (2013.01); *B01D 46/0002* (2013.01); *F01N 11/002* (2013.01); *F01N 13/007* (2013.01); *F01N 13/008* (2013.01); *F01N 2560/026* (2013.01); *F01N 2900/1602* (2013.01)

(58) Field of Classification Search
CPC .... F01N 3/0842; F01N 11/002; F01N 13/007; F01N 13/008; B01D 46/0002
USPC .......................................................... 60/274
See application file for complete search history.

(56) References Cited

U.S. PATENT DOCUMENTS

| | | | | |
|---|---|---|---|---|
| 2,153,350 | A * | 4/1939 | Emil Stimac | F02M 21/00 123/586 |
| 2,155,162 | A * | 4/1939 | David Firth | F02M 7/12 123/545 |
| 3,210,004 | A * | 10/1965 | Hunt Paulr | F02M 1/02 236/101 R |

(Continued)

FOREIGN PATENT DOCUMENTS

| | | |
|---|---|---|
| JP | 6475117 B2 | 2/2019 |
| KR | 101491353 B1 | 2/2015 |

*Primary Examiner* — Jason D Shanske
(74) *Attorney, Agent, or Firm* — Slater Matsil, LLP

(57) ABSTRACT

A device for screening a $NO_x$ sensor provided on a front end of a tail pipe includes a screen, a screen rotating shaft to which the screen is fixed and having a screen lever, a first fixed shaft having a second end that is coupled to or separated from a first end of the screen rotating shaft, and an axial side extension part with a temperature sensitive length extension and contraction part that is opposite to the screen lever, a second fixed shaft having a return spring, a rotary stopper coupled to the screen rotating shaft, and a first fixing plate located inside the front end of the tail pipe and deformed to fix the rotary stopper or to pass the fixed rotary stopper in an opposite direction, wherein each of the first end and the second end is inclined to a side.

20 Claims, 22 Drawing Sheets

(56) References Cited

U.S. PATENT DOCUMENTS

| | | | | |
|---|---|---|---|---|
| 3,699,937 | A * | 10/1972 | De Petris | F02M 1/12 |
| | | | | 261/39.6 |
| 3,813,085 | A * | 5/1974 | Nakada | F02M 1/10 |
| | | | | 261/39.3 |
| 3,886,917 | A * | 6/1975 | Nakada | F02M 1/10 |
| | | | | 261/39.4 |
| 4,081,499 | A * | 3/1978 | Ishii | F02M 1/12 |
| | | | | 236/101 C |
| 4,096,837 | A * | 6/1978 | Iiyama | F02M 1/12 |
| | | | | 123/435 |
| 4,131,099 | A * | 12/1978 | Wessel | F02M 1/00 |
| | | | | 261/39.3 |
| 4,151,499 | A * | 4/1979 | Ganowsky | H01F 7/145 |
| | | | | 335/272 |
| 4,187,815 | A * | 2/1980 | Kobayashi | F02M 31/083 |
| | | | | 123/548 |
| 5,121,727 | A * | 6/1992 | Kramer | F02D 11/107 |
| | | | | 123/337 |
| 2014/0262644 | A1 * | 9/2014 | Browne | B60T 5/00 |
| | | | | 188/264 AA |

* cited by examiner

DEVICE FOR SCREENING $NO_X$ SENSOR

CROSS-REFERENCE TO RELATED APPLICATIONS

This application claims priority to Korean Patent Application No. 10-2019-0161436, filed on Dec. 6, 2019, which application is hereby incorporated herein by reference.

TECHNICAL FIELD

The present invention relates to a device for screening a nitrous oxide ($NO_x$) sensor.

BACKGROUND

Euro 6 has been applied since January 2015 as an emission control for a large transportation vehicle and a large construction machinery vehicle. As the emission control is tightened, an exhaust-gas purification function as well as a function of monitoring whether the purification function is normally performed is required (OBD tightened laws). In order to meet these requirements, various sensors are added to a tail-pipe front end of an exhaust-gas purification device. FIG. 1 illustrates a conventional exhaust-gas purification device. As shown in FIG. 1, a temperature sensor 11 and a $NO_x$ sensor 12 are added to the tail-pipe front end 10 of the conventional exhaust-gas purification device 1.

When a large construction machinery vehicle such as a dump truck or a mixer truck leaves a construction site, contaminated tires undergo a wheel washing operation. The wheel washing operation is an operation where a nozzle mounted on a ground sprays high-pressure washing water towards a lower portion of the vehicle and a tail-pipe rear end. In this process, some water particles may come into contact with a $NO_x$ sensor located at the tail-pipe front end to rapidly cool an internal ceramic material heated to a high temperature, thus leading to damage.

FIG. 2 illustrates the rear end of the tail pipe after the wheel washing operation. Referring to FIG. 2, it can be seen that the inside of the tail pipe is wet. FIG. 3A illustrates a $NO_x$ sensor, and FIGS. 3B and 3C show results when the $NO_x$ sensor is surrounded with litmus paper and then the wheel washing operation is performed. Referring to FIGS. 3B and 3C, it can be seen that water comes into contact with the outside of the sensor. FIG. 4 is a photograph of a sensor cell element of the ceramic material included in the $NO_x$ sensor. Referring to FIG. 4, it can be seen that cracks occurred due to the inflow of water particles.

As an alternative to solve problems in the art, the mounting angle of the tail pipe may be changed. However, the conventional mounting angle, namely, 30 to 45° should be maintained to minimize the blowing of dust on the ground by the discharge of exhaust gas. Meanwhile, the length of the tail pipe may be increased. However, the increase in length is limited in a current specification due to vehicle height standards and layout problems. Japanese patent document JP 6475117 B2 and Korean patent document KR 10-1491353 B1 disclose subject matter related to subject matter disclosed herein.

SUMMARY

The present invention relates to a device for screening a $NO_X$ sensor. Particular embodiments relate to a structure of an exhaust-gas purification device installed in a large transportation vehicle and a large construction machinery vehicle. Various embodiments relate to a tail-pipe front end of an exhaust-gas purification device equipped with a $NO_X$ sensor.

Embodiments of the present invention can solve problems associated with prior art and provide a device which prevents water from coming into contact with a $NO_x$ sensor and prevents the $NO_x$ sensor from being damaged while maintaining the mounting angle and length of a tail pipe.

One embodiment of the present invention provides a device for screening a $NO_x$ sensor provided on a front end of a tail pipe, the device including a screen, a screen rotating shaft to which the screen is fixed and which has a screen lever, a first fixed shaft having a second end that is coupled to or separated from a first end of the screen rotating shaft, and an axial side extension part with a temperature sensitive length extension and contraction part that is opposite to the screen lever, a second fixed shaft having a return spring that is compressed by the screen rotating shaft or pushes the screen rotating shaft, a rotary stopper coupled to the screen rotating shaft, and a first fixing plate located inside the front end of the tail pipe and deformed to fix the rotary stopper passing in one direction or to pass the fixed rotary stopper in an opposite direction, wherein each of the first end and the second end is inclined to a side.

The temperature sensitive length extension and contraction part may be a bimetal.

The temperature sensitive length extension and contraction part may be a coiled bimetal.

The rotary stopper may be hinged to a coupling part formed on the screen rotating shaft.

The rotary stopper may include a coupling end coupled to the coupling part and a contact end coming into contact with the first fixing plate, and the contact end may include an end formed as a chamfer.

A torsion spring may be provided on a side surface of the coupling end.

A second fixing plate may be provided on a front surface of the rotary stopper.

Deformation of the first fixing plate may be thermal deformation due to a change in temperature.

The thermal deformation may be the bending of the first fixing plate.

The thermal deformation may occur when diesel particulate filter (DPF) recycling is terminated or an engine load is reduced.

The first fixing plate may pass through the front end of the tail pipe to be located inside or outside the front end of the tail pipe, and may be integrated therewith.

The first fixing plate may be thermally deformed when water comes into contact with the first fixing plate positioned outside the front end of the tail pipe.

The first fixing plate may be a bimetal.

The first fixing plate may be a plate-shaped bimetal.

The screen lever may include a flange that is coupled to the screen rotating shaft, and a third end that is hinged to the flange and is opposite to the temperature sensitive length extension and contraction part, and the hinge line may not correspond to a length extending direction of the temperature sensitive length extension and contraction part.

The hinge line may be perpendicular to the length extending direction of the temperature sensitive length extension and contraction part.

The screen may be parallel to an exhaust-gas flow direction, when the screen rotating shaft is separated from the first fixed shaft.

The screen rotating shaft and the first fixed shaft may be separated from each other when the DPF is recycled or the engine load is increased.

The screen may be perpendicular to the exhaust-gas flow direction, when the screen rotating shaft is coupled to the first fixed shaft.

When vehicle-start is off, in an idle state, when the DPF recycling is terminated, when the engine load is reduced, or when water comes into contact with the first fixing plate extending to an outside of the front end of the tail pipe, the screen rotating shaft may be coupled to the first fixed shaft.

According to embodiments of the present invention, it is possible to prevent water from coming into contact with a $NO_x$ sensor and prevent the $NO_x$ sensor from being damaged while maintaining the mounting angle and length of a tail pipe.

DETAILED DESCRIPTION OF ILLUSTRATIVE EMBODIMENTS

Hereinafter, embodiments of the present invention will be described in detail. However, the present invention is not limited or restricted by exemplary embodiments. The objects and effects of embodiments of the present invention may be naturally understood or more apparent from the following description, and are not limited by the following description. Further, in the description of embodiments of the present invention, when it is determined that the related art of the present invention unnecessarily makes the gist of the present invention obscure, a detailed description thereof will be omitted.

Figure 1:
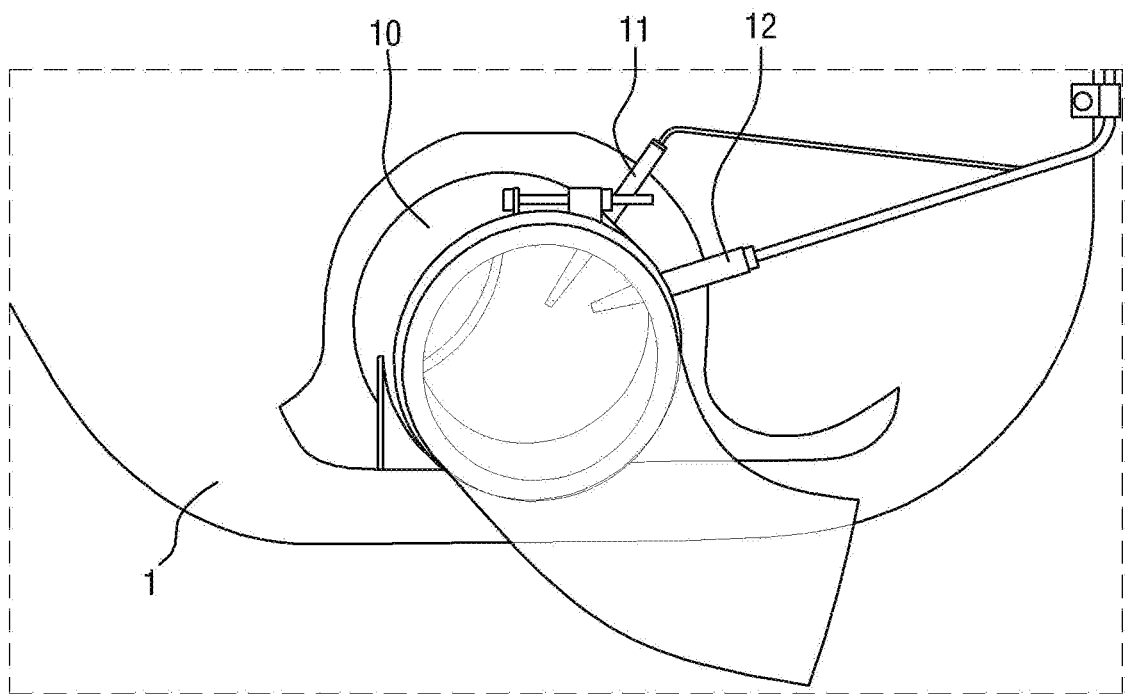
FIG. 1 illustrates a conventional exhaust-gas purification device.
Figure 2:
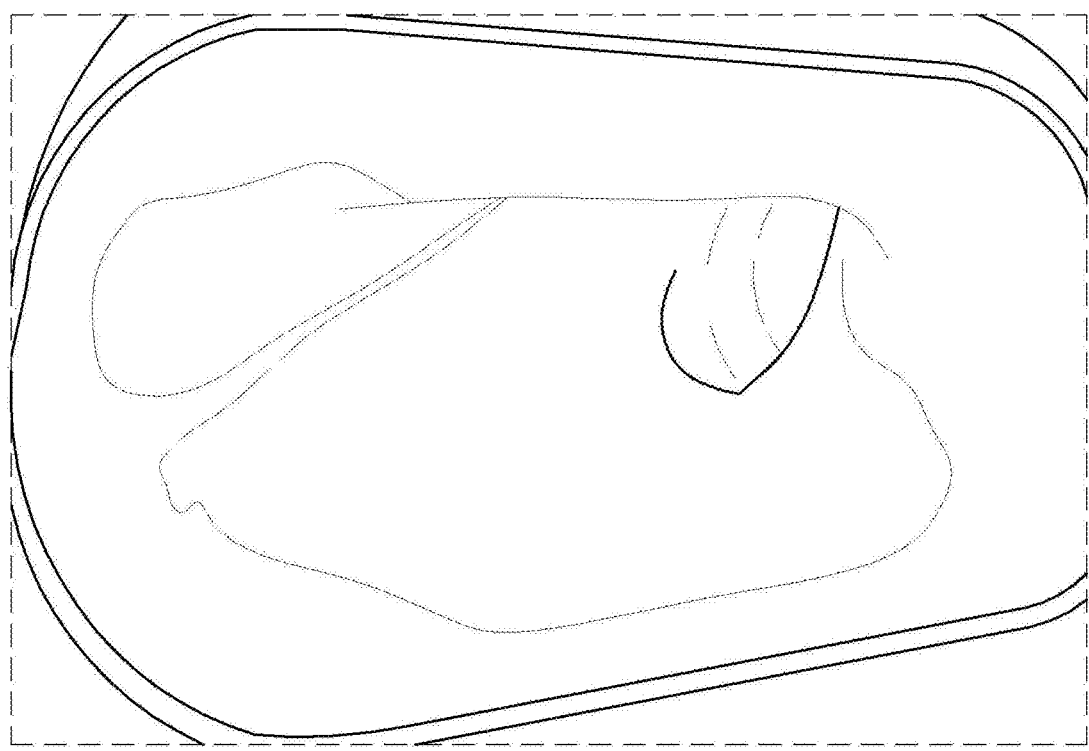
FIG. 2 illustrates a rear end of a tail pipe after a wheel washing operation.
Figure 3A:
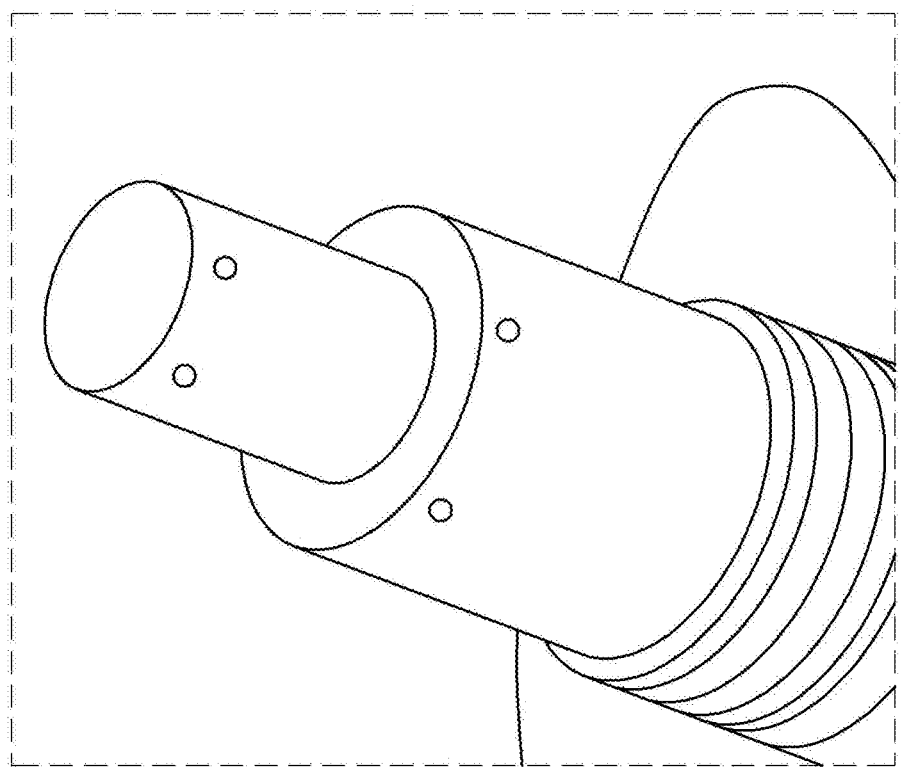
FIG. 3A illustrates a $NO_x$ sensor.
Figure 3B:
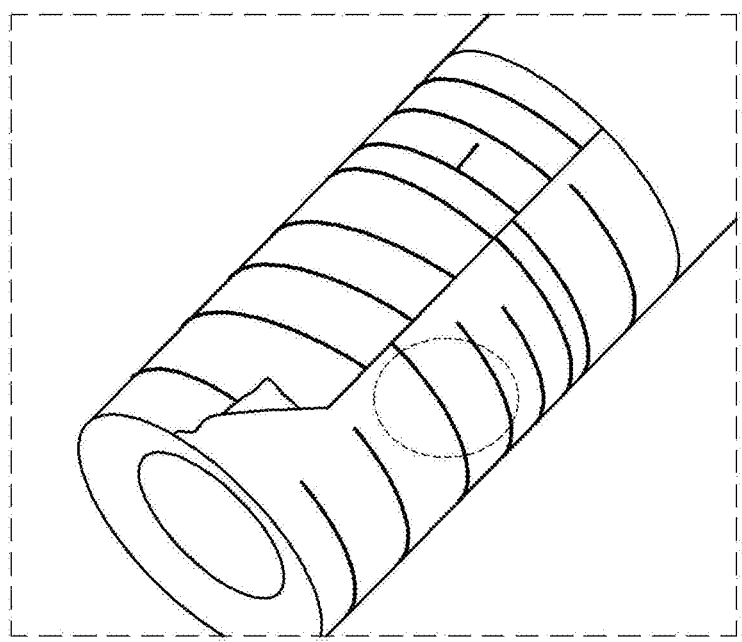
FIGS. 3B and 3C show results when the $NO_x$ sensor is surrounded with litmus paper and then the wheel washing operation is performed.
Figure 3C:
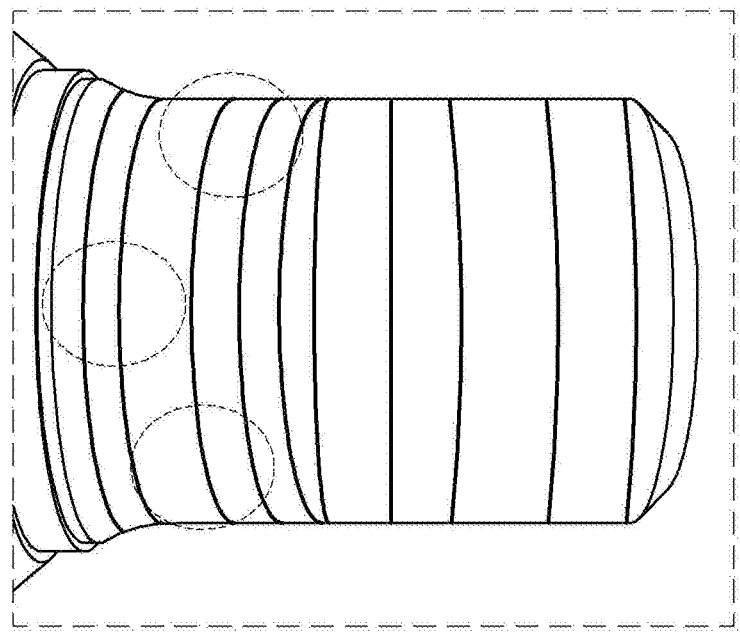
Figure 4:
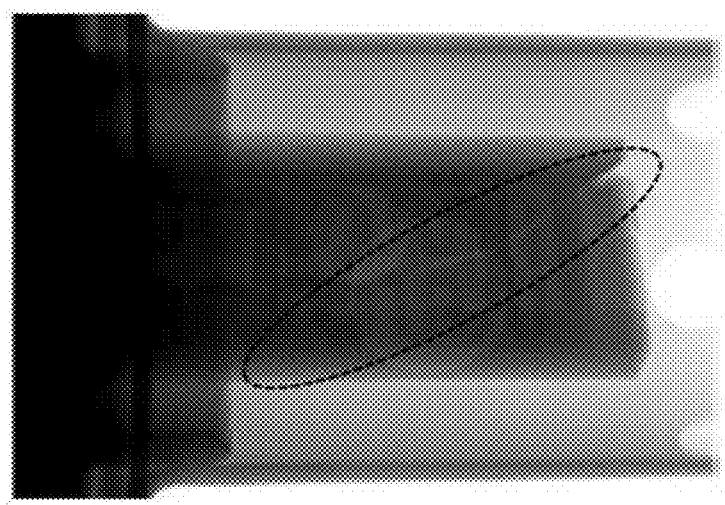
FIG. 4 is a photograph of a sensor cell element of a ceramic material included in the $NO_x$ sensor.
Figure 5:
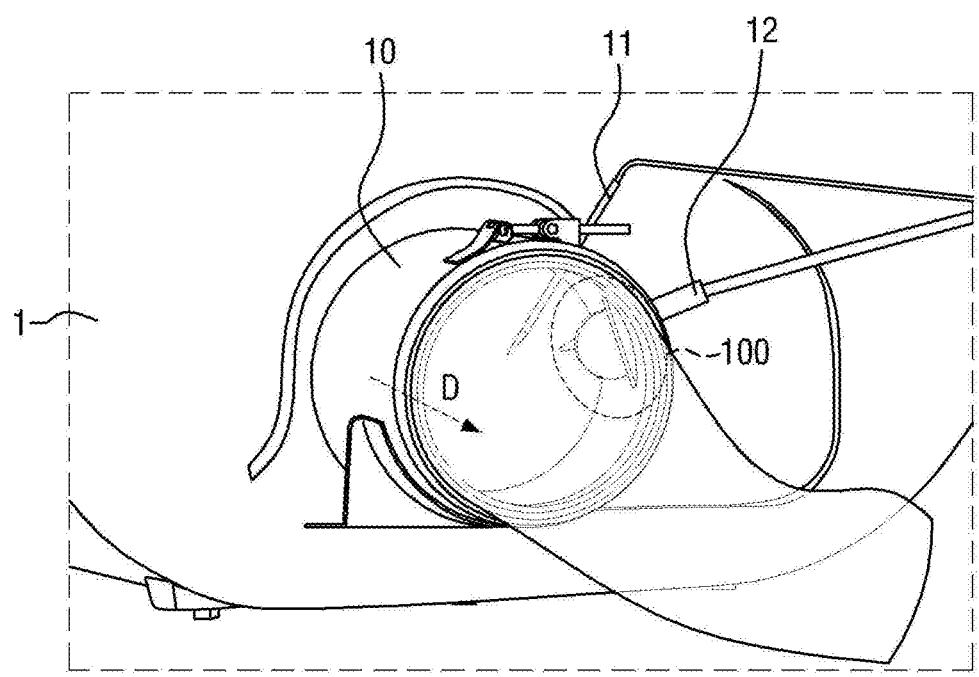
FIG. 5 illustrates a front end of the tail pipe having a device for screening a $NO_x$ sensor according to embodiments of the present invention.

FIG. 5 illustrates a front end of a tail pipe having a device for screening a $NO_x$ sensor according to embodiments of the present invention. Referring to FIG. 5, a temperature sensor 11, a $NO_x$ sensor 12, and a $NO_x$ sensor screening device 100 may be provided on a front end 10 of the tail pipe of an exhaust-gas purification device 1, and a $NO_x$ sensor screening device 100 may be located on a rear end of the $NO_x$ sensor 12 in an exhaust-gas flow direction D.

Figure 6:
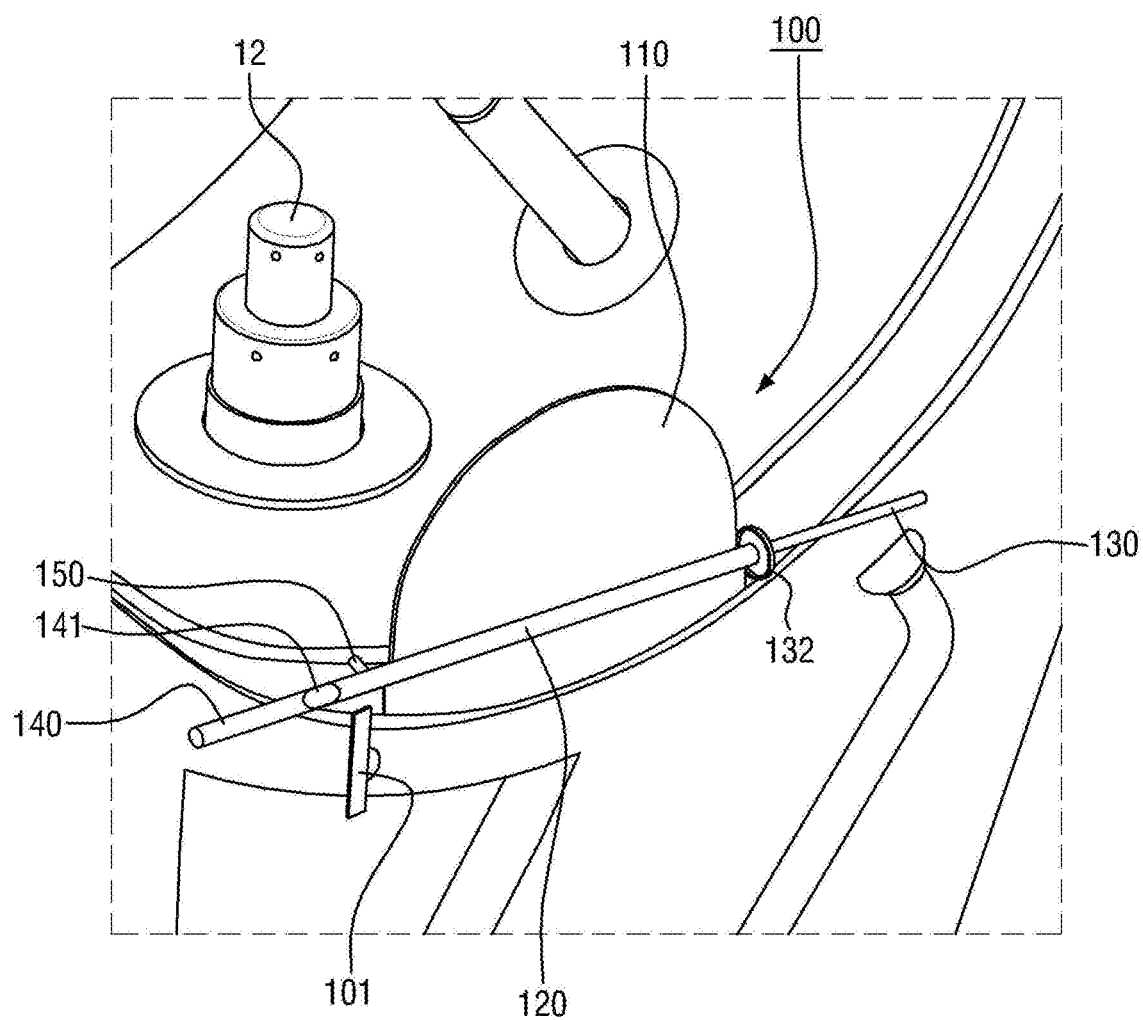
FIG. 6 illustrates a side of the $NO_x$ sensor screening device according to embodiments of the present invention.
Figure 7:
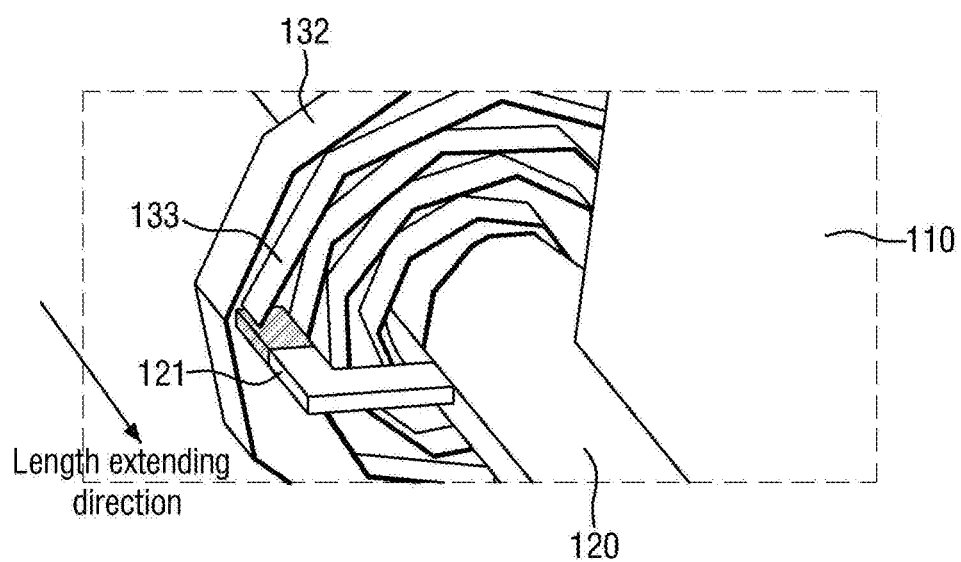
FIG. 7 is an enlarged view illustrating a screen lever, a temperature sensitive length extension and contraction part, and an axial side extension part constituting the device of embodiments of the present invention.
Figure 8:
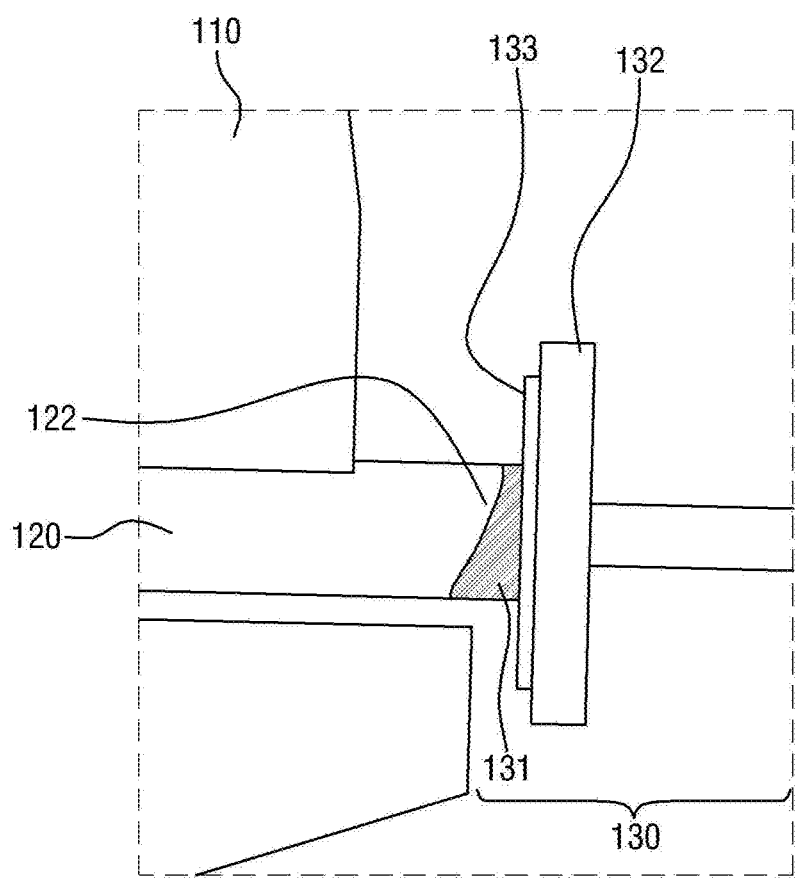
FIG. 8 illustrates a state in which a screen rotating shaft and a first fixed shaft constituting the device of embodiments of the present invention are coupled with each other.

FIG. 6 illustrates a side of the $NO_x$ sensor screening device according to embodiments of the present invention. FIG. 7 is an enlarged view illustrating a screen lever, a temperature sensitive length extension and contraction part, and an axial side extension part constituting the device of embodiments of the present invention. FIG. 8 illustrates a state in which a screen rotating shaft and a first fixed shaft constituting the device of embodiments of the present invention are coupled with each other. Referring to FIGS. 6 to 8, the $NO_x$ sensor screening device 100 according to embodiments of the present invention includes a screen 110, a screen rotating shaft 120 to which the screen 110 is fixed and which has a screen lever 121, a first fixed shaft 130 having a second end 131 coupled to or separated from a first end 122 of the screen rotating shaft 120 and an axial side extension part 132 with a temperature sensitive length extension and contraction part 133 that is opposite to the screen lever 121, a second fixed shaft 140 having a return spring 141 that is compressed by the screen rotating shaft 120 or pushes the screen rotating shaft 120, a rotary stopper 150 coupled to the screen rotating shaft 120, and a first fixing plate 101 that is located inside the front end 10 of the tail pipe and is deformed to fix the rotary stopper 150 passing in one direction or to pass the fixed rotary stopper 150 in an opposite direction. Each of the first end 122 and the second end 131 may be inclined to one side. The temperature sensitive length extension and contraction part 133 will be described below.

In a vehicle stopped state required for the vehicle-wheel washing operation, for example, a vehicle start-off state without the flow of exhaust gas or an idle state in which the exhaust gas flows but the temperature of the exhaust gas is low, the temperature sensitive length extension and contraction part 133 may not extend in length towards the screen lever 121. When a temperature environment in the tail pipe changes, for example, when an exhaust-gas temperature increases with the recycling of a diesel particulate filter (DPF) or the increase in vehicle load, the temperature sensitive length extension and contraction part 133 may extend towards the screen lever 121, and may push the screen lever 121 in a length extending direction of the temperature sensitive length extension and contraction part 133. Thus, the first end 122 may be separated from the second end 131. Preferably, the temperature sensitive length extension and contraction part 133 may be inserted into the axial side extension part 132, and the axial side extension part 132 may be secured to the first fixed shaft 130. In contrast, when the exhaust-gas temperature decreases with the termination of the DPF recycling or a reduction in vehicle load, the temperature sensitive length extension and contraction part 133 may be contracted in a direction opposite to the length extending direction. Meanwhile, the temperature sensitive length extension and contraction part 133 may be a bimetal, and more preferably a coiled bimetal.

Figure 9:
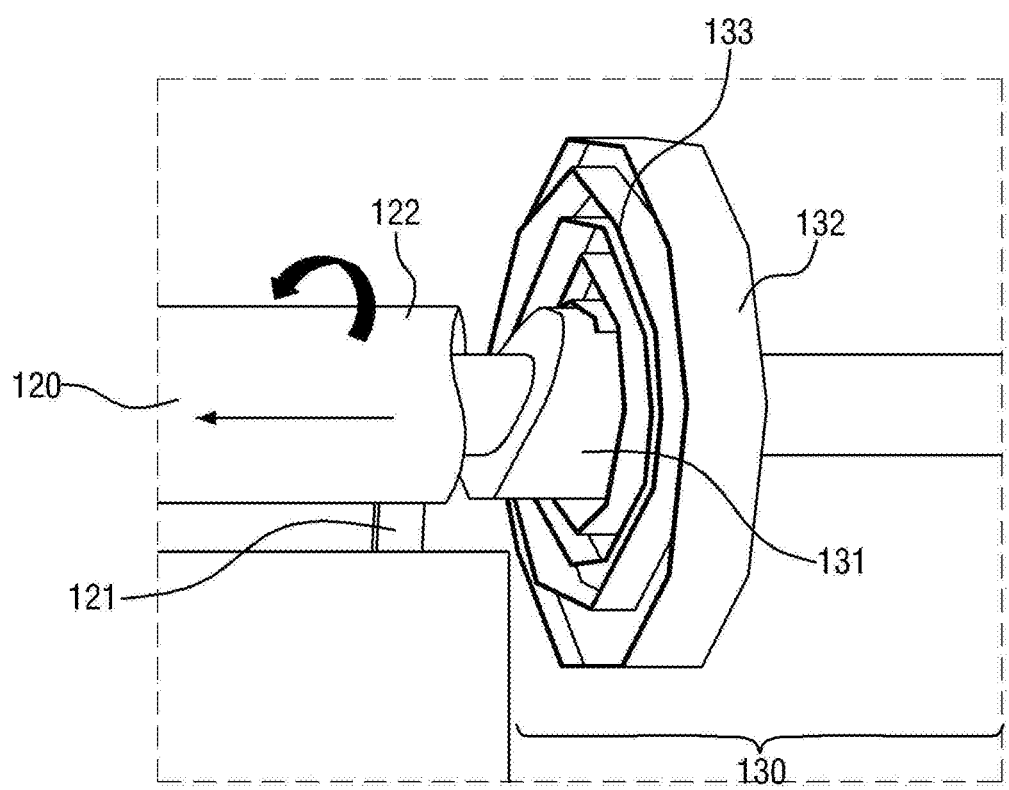
FIG. 9 illustrates a state in which the screen rotating shaft is separated from the first fixed shaft.
Figure 10:
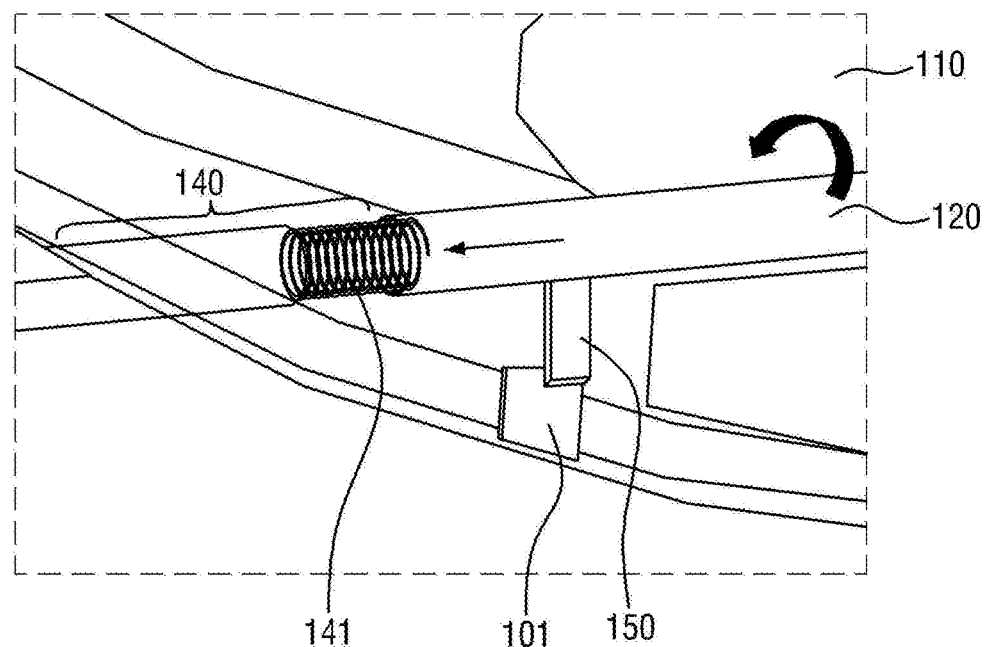
FIG. 10 illustrates a state in which the screen rotating shaft separated from the first fixed shaft moves and a state in which a rotary stopper passes through a first fixing plate.

FIG. 9 illustrates a state in which the screen rotating shaft is separated from the first fixed shaft. FIG. 10 illustrates a state in which the screen rotating shaft separated from the first fixed shaft moves and a state in which a rotary stopper passes through the first fixing plate. Referring to FIGS. 9 and 10, the first end 122 of the screen rotating shaft 120 may be rotated in one direction along an inclined surface of the second end 131 of the first fixed shaft 130, for example, counterclockwise. Thus, the screen rotating shaft 120 and the screen no may also be rotated counterclockwise. As the screen rotating shaft 120 moves towards the second fixed shaft 140, contact between the screen lever 121 and the temperature sensitive length extension and contraction part 133 may be released, and the screen rotating shaft 120 may compress the return spring 141. The rotary stopper 150 may pass through the first fixing plate 101 in one direction, and the first fixing plate 101 may fix the rotary stopper 150 so that the rotary stopper 150 does not pass back in an opposite direction. According to an embodiment of the present invention, the rotary stopper 150 may be coupled to an axis adjacent to the other end of the screen rotating shaft 120. According to another embodiment of the present invention, the rotary stopper 150 may be hinged to a coupling part formed on the screen rotating shaft 120. A process where the hinged rotary stopper 150 passes through the first fixing plate 101 will be described in detail with reference to FIGS. 11 to 13.

Figure 11:
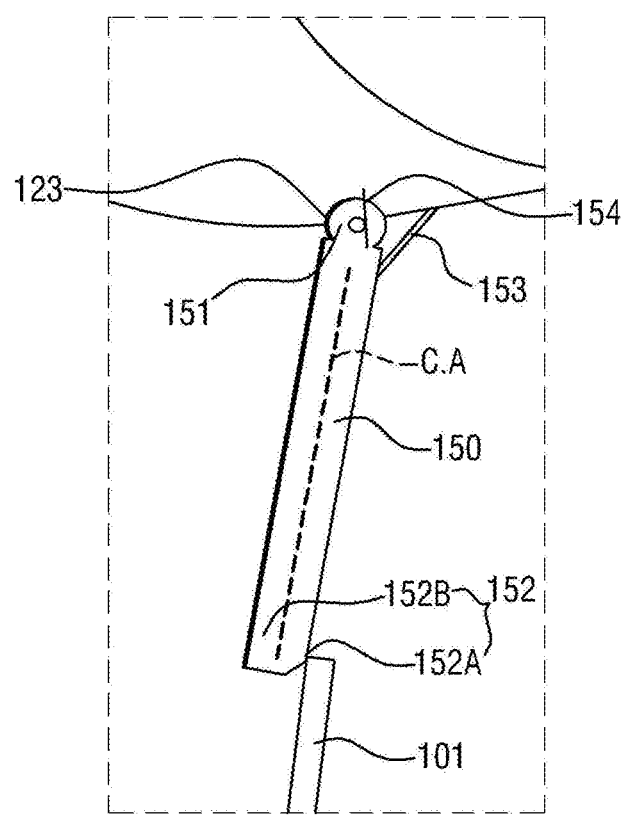
FIG. 11 illustrates a state in which the rotary stopper first comes into contact with the first fixing plate.
Figure 12:
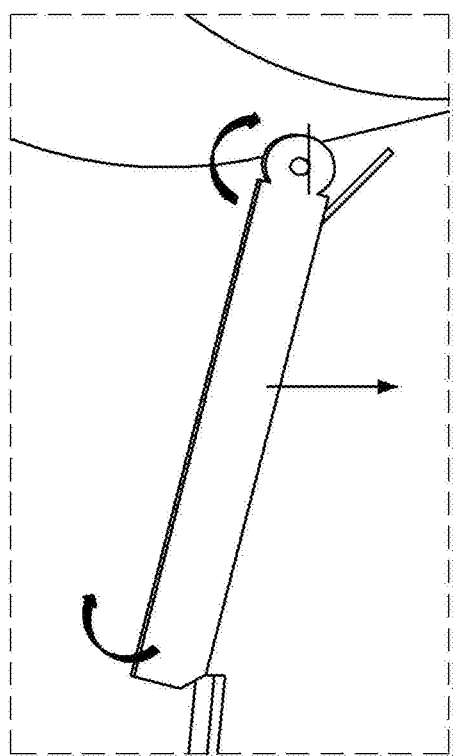
FIG. 12 illustrates a state before the rotary stopper rotates clockwise to pass through the first fixing plate.
Figure 13:
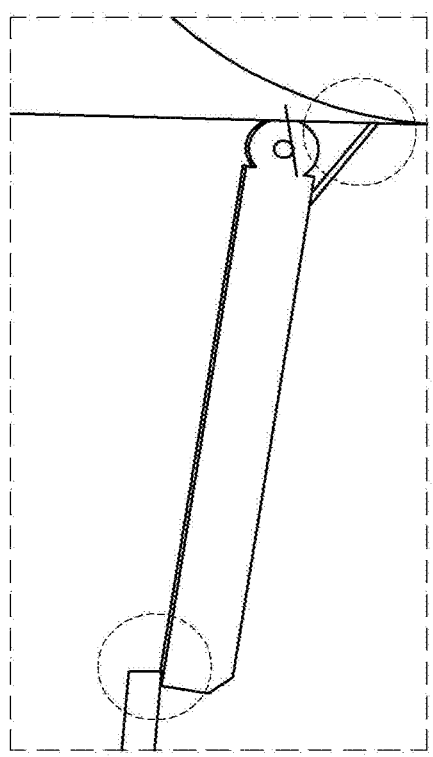
FIG. 13 illustrates a state after the rotary stopper passes through the first fixing plate.

FIG. 11 illustrates a state in which the rotary stopper first comes into contact with the first fixing plate. FIG. 12 illustrates a state before the rotary stopper rotates clockwise to pass through the first fixing plate. FIG. 13 illustrates a state after the rotary stopper passes through the first fixing plate. Among two ends of the rotary stopper 150 shown in FIGS. 11 to 13, an end hinged to the coupling part 123 of the screen rotating shaft 120 is referred to as a coupling end 151, while a remaining end, namely, an end coming into contact with the first fixing plate 101 is referred to as a contact end 152. The contact end 152 may be divided into a first contact end 152A that is formed as a chamfer with respect to a central axis C. A of the rotary stopper 150, and a second contact end 152B that is not formed as a chamfer. A surface of the rotary stopper 150 on which the first contact end 152A is present is referred to as a front surface of the rotary stopper 150, and a surface of the first fixing plate 101 with which the first contact end 152A first comes into contact is referred to as a front surface of the first fixing plate 101. Meanwhile, the front surfaces of the rotary stopper and the first fixing plate may be determined on the basis of a direction in which the rotary stopper first approaches the first fixing plate.

Referring to FIGS. 11 to 13, the first contact end 152A may come into contact with the front surface of the first fixing plate 101, and the rotary stopper 150 may pass through the first fixing plate 101 while being rotated clockwise by the first fixing plate 101 and the hinged coupling. The rotary stopper 150 may more easily pass through the first fixing plate 101 by the chamfer of the first contact end 152A. A second fixing plate 153 may be provided on the front surface of the rotary stopper 150 adjacent to the coupling end 151, and a torsion spring 154 may be provided on a side surface of the coupling end 151. The torsion spring 154 may maintain the positional state of the rotary stopper 150. After the rotary stopper 150 passes through the first fixing plate 101, the spring force of the torsion spring 154 may rotate the rotary stopper 150 counterclockwise, and the second fixing plate 153 may come into contact with the screen rotating shaft 120. Thus, the second fixing plate 153 may prevent the rotary stopper 150 from rotating counterclockwise. The second contact end 152B may come into contact with a rear surface of the first fixing plate 101, and the first fixing plate 101 may prevent the rotary stopper 150 and the screen rotating shaft 120 from rotating clockwise.

Figure 14:
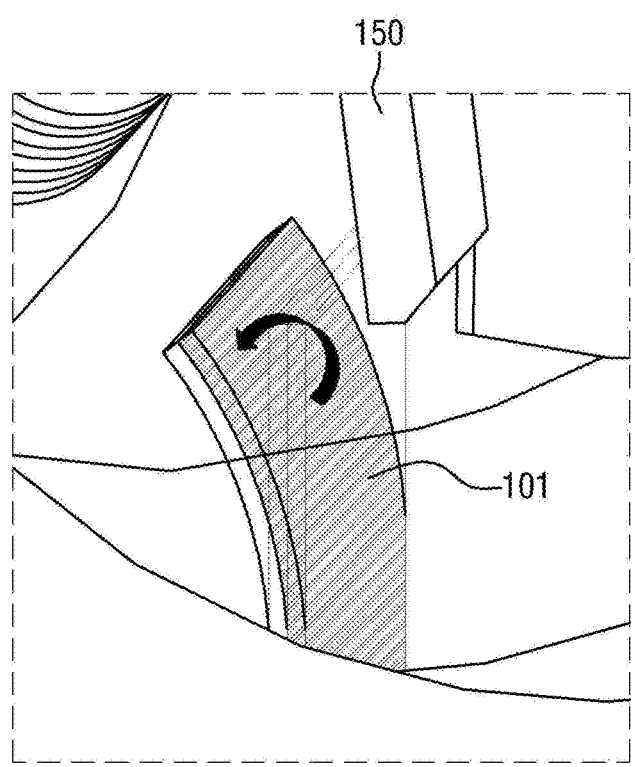
FIG. 14 illustrates the deformation of the first fixing plate.

FIG. 14 illustrates the deformation of the first fixing plate. Referring to FIG. 14, the deformation of the first fixing plate 101 may provide an environment under which the rotary stopper 150 may pass in an opposite direction, and provide an environment under which the screen rotating shaft may rotate clockwise. The deformation of the first fixing plate 101 may be thermal deformation due to a change in temperature, and the change in temperature may cause the first fixing plate 101 to be bent. The first fixing plate 101 may be a bimetal having a high thermal strain, and more preferably, a plate-shaped bimetal. If the exhaust-gas temperature decreases with the termination of the DPF recycling or the reduction in vehicle load, the first fixing plate 101 may be thermally deformed.

Figure 15:
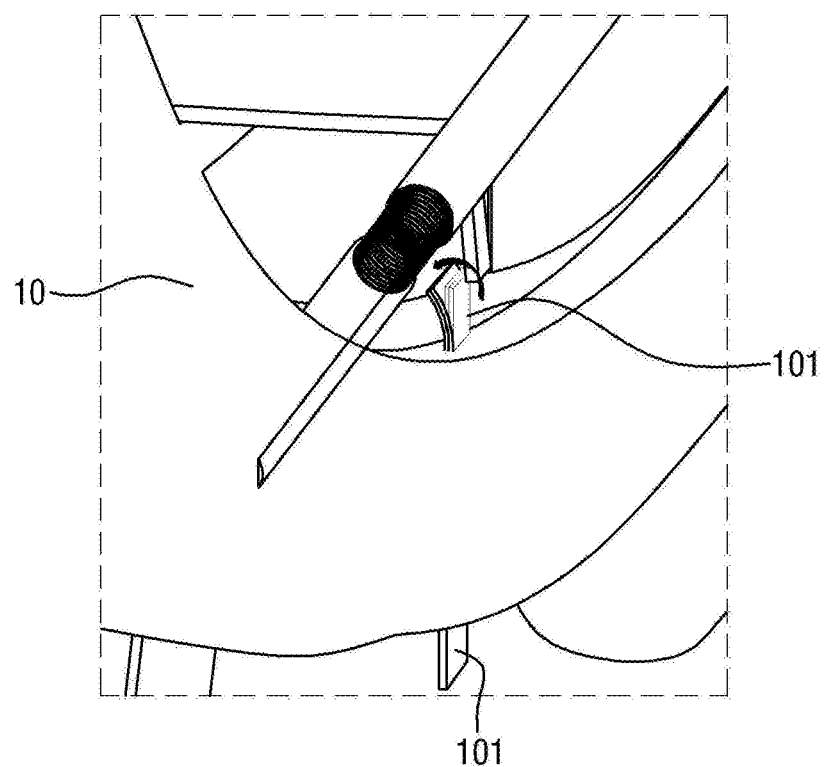
FIG. 15 illustrates a further embodiment in which the first fixing plate is thermally deformed.

FIG. 15 illustrates a further embodiment in which the first fixing plate is thermally deformed. Referring to FIG. 15, the first fixing plate 101 may pass through the front end 10 of the tail pipe to be located inside or outside the front end 10 of the tail pipe, or may be integrated therewith. When water comes into contact with the first fixing plate 101 outside the front end 10 of the tail pipe and thereby the temperature of the first fixing plate 101 reduces rapidly, the first fixing plate 101 may be thermally deformed.

Figure 16:
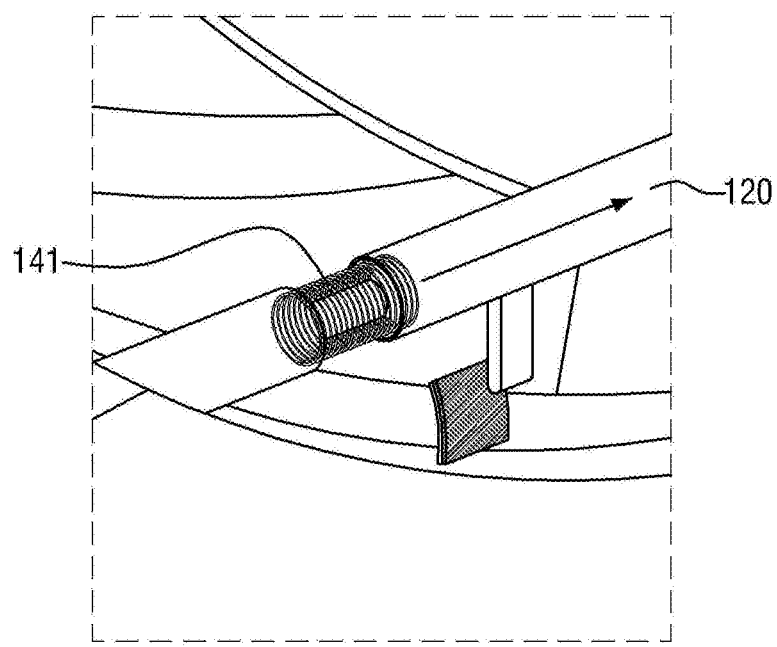
FIG. 16 illustrates a state in which a compressed return spring pushes the screen rotating shaft.

FIG. 16 illustrates a state in which a compressed return spring pushes the screen rotating shaft. Referring to FIG. 16, the return spring 141 compressed by the screen rotating shaft 120 may push the screen rotating shaft 120 towards the first fixed shaft. Referring back to the coupled state of FIG. 8 and the inclined surface of each of the first end 122 and the second end 131 shown in FIG. 9, while the first end 122 of the screen rotating shaft 120 rotates clockwise along the inclined surface of the second end 131 of the first fixed shaft 13*o*, the screen rotating shaft 120 and the screen no may rotate clockwise, and the screen rotating shaft 120 may be coupled to the first fixed shaft 130 again.

Figure 17:
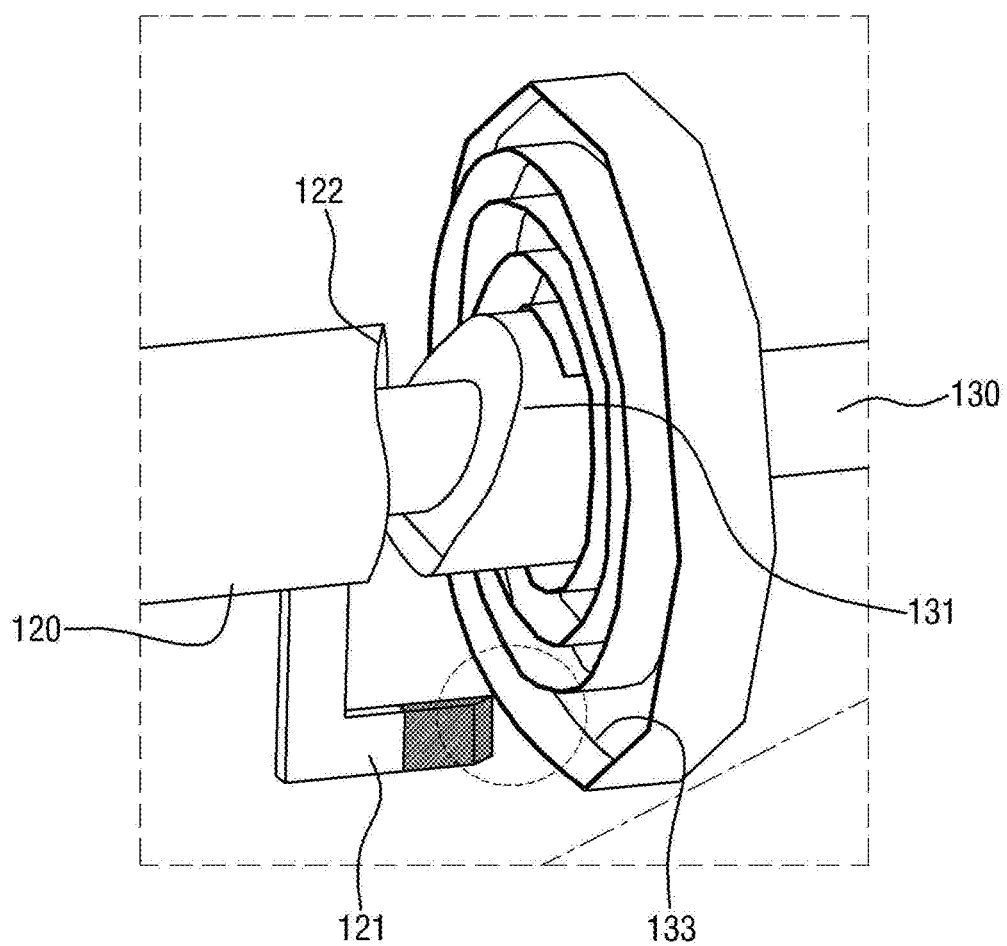
FIG. 17 illustrates a case in which the contraction amount of the temperature sensitive length extension and contraction part is small.

FIG. 17 illustrates a case in which the contraction amount of the temperature sensitive length extension and contraction part is small. The case in which the contraction amount of the temperature sensitive length extension and contraction part is small means that the temperature sensitive length extension and contraction part is contracted but its length does not reach a length before extension. Referring to FIG. 17, while the screen rotating shaft 120 moves towards the first fixed shaft 130, the end of the screen lever 121 may overlap with the temperature sensitive length extension and contraction part 133. Thus, the screen rotating shaft 120 is coupled to the first fixed shaft 130. To be more specific, this may hinder the first end 122 from being coupled to the second end 131. The screen rotating shaft 120 may move towards the second fixed shaft again, and a gap may occur between the screen lever 121 and the temperature sensitive length extension and contraction part 133.

Figure 18:
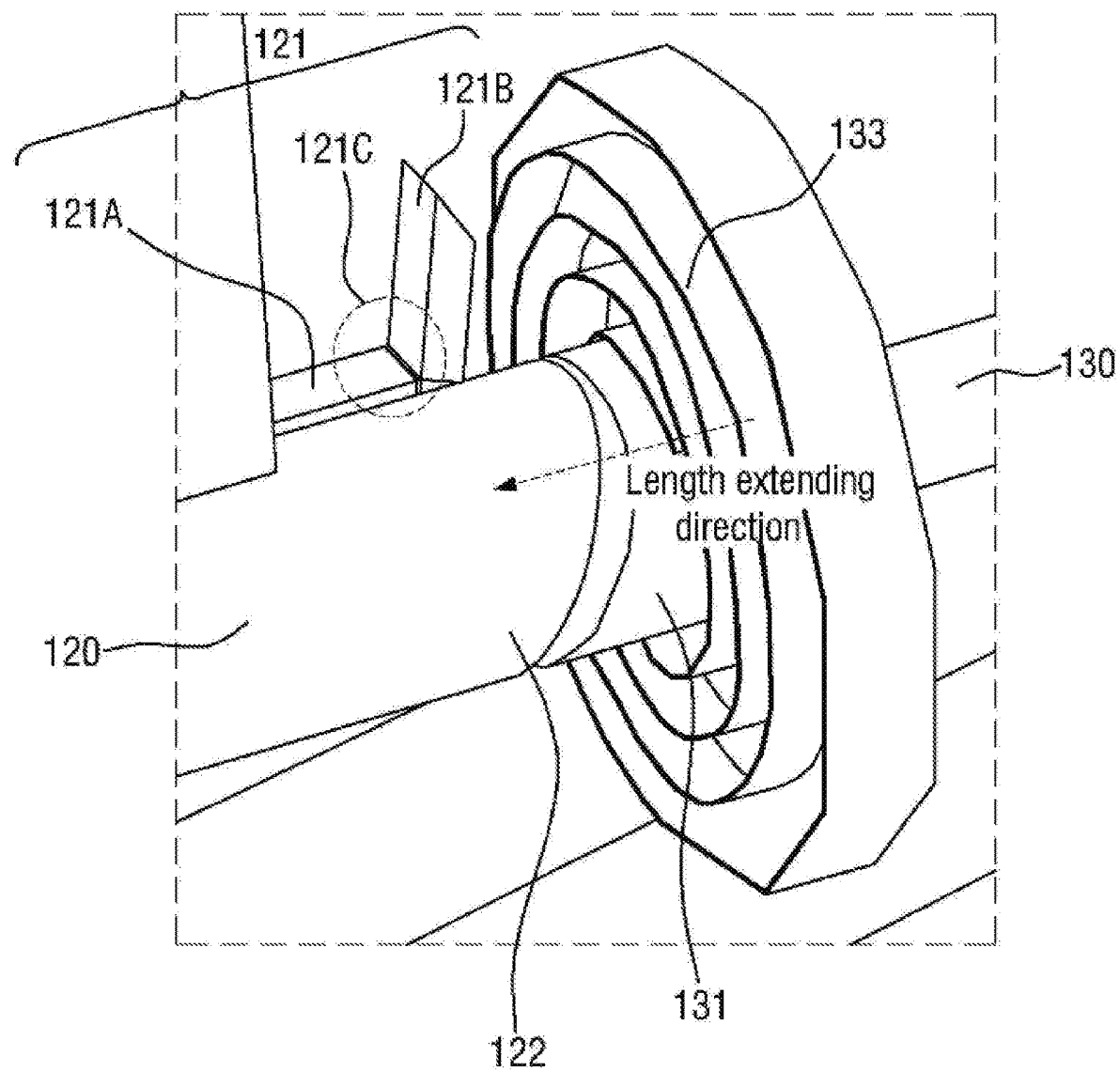
FIG. 18 illustrates a hinge line formed on the screen lever.

FIG. 18 illustrates a hinge line formed on the screen lever. Referring to FIG. 18, the screen lever 121 may include a flange 121A that is coupled to the screen rotating shaft 120, and a third end 121B that is hinged to the flange 121A and is opposite to the temperature sensitive length extension and contraction part 133. The hinge line 121C may not correspond to the length extending direction of the temperature sensitive length extension and contraction part 133. Preferably, the longitudinal direction of the hinge line 121C may be perpendicular to the length extending direction of the temperature sensitive length extension and contraction part 133. The third end 121B may be rotated counterclockwise by the hinge line 121C, and may couple the screen rotating shaft 120 to the first fixed shaft 130. When the temperature sensitive length extension and contraction part 133 is sufficiently contracted, namely, reaches a length before extension, an overlap between the third end 121B and the temperature sensitive length extension and contraction pall 133 may be eliminated. The third end 121B may return to a position before the temperature sensitive length extension and contraction part 133 extends, that is, a position where the third end is opposite to the temperature sensitive length extension and contraction pall 133 again.

Figure 19:
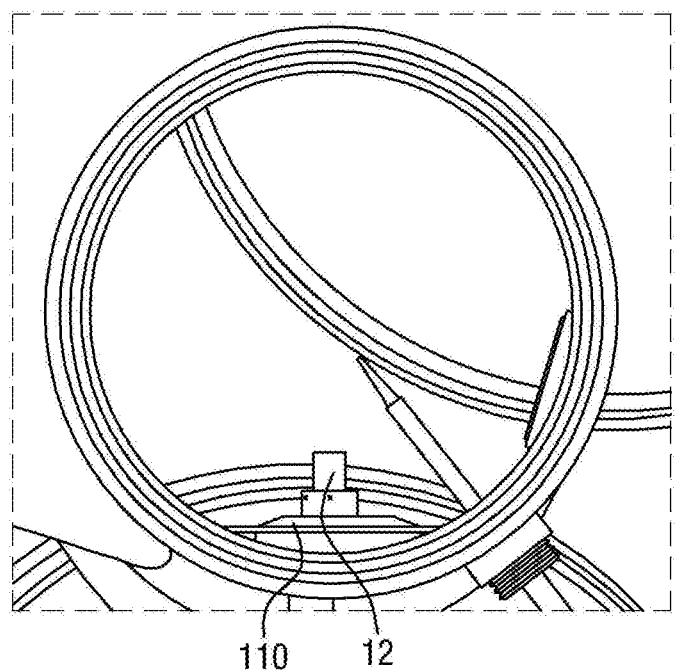
FIG. 19 illustrates the positional state of a screen, when the screen rotating shaft is separated from the first fixed shaft.

FIG. 19 illustrates the positional state of the screen, when the screen rotating shaft is separated from the first fixed shaft. Referring to FIG. 19, the screen 110 may be parallel to the exhaust-gas flow direction in the tail pipe, and may be perpendicular to the longitudinal direction of the $NO_x$ sensor 12. This may be equal to the positional state of the screen when the DPF is recycled or an engine load is increased.

Figure 20:
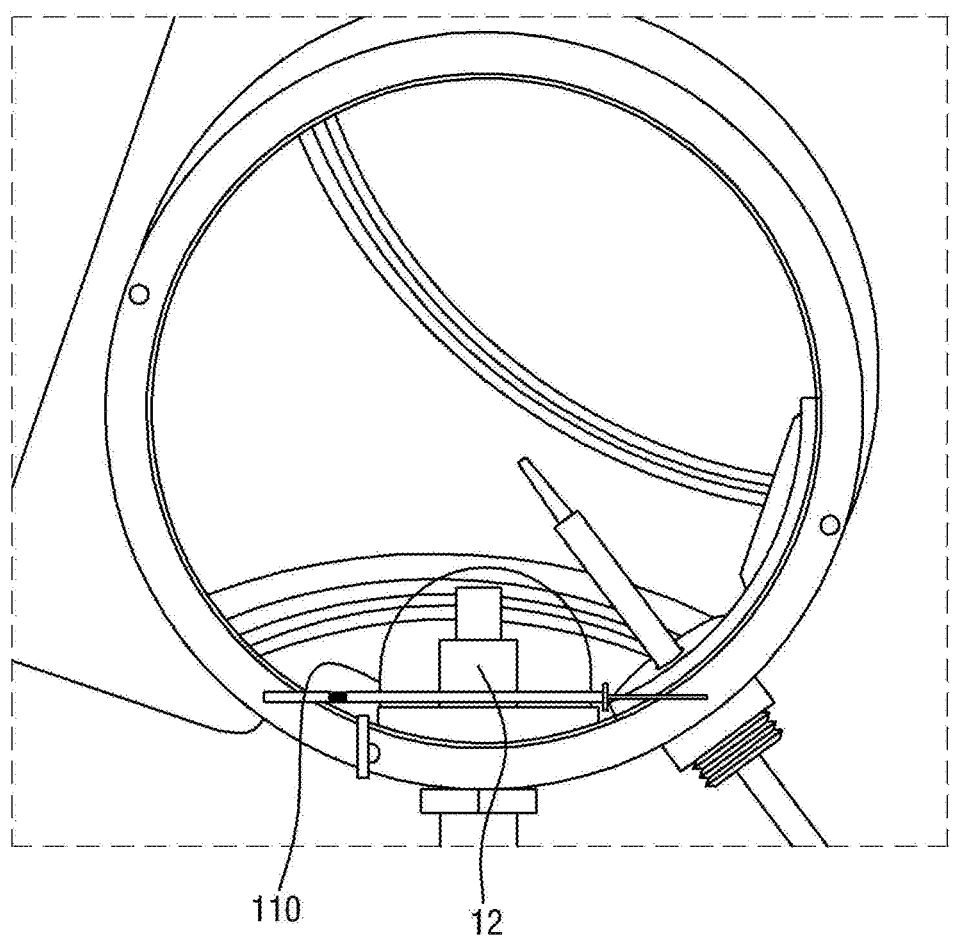
FIG. 20 illustrates the positional state of the screen, when the screen rotating shaft is coupled to the first fixed shaft.

FIG. 20 illustrates the positional state of the screen, when the screen rotating shaft is coupled to the first fixed shaft. Referring to FIG. 20, the screen no may be perpendicular to the exhaust-gas flow direction in the tail pipe, and may be parallel to the longitudinal direction of the $NO_x$ sensor 12, and may be opposite to the $NO_x$ sensor 12. This may be equal to the positional state of the screen when the vehicle-start is off, in the idle state, when the DPF recycling is terminated, when the engine load is decreased, and when water comes into contact with the first fixing plate outside the front end of the tail pipe.

Figure 21:
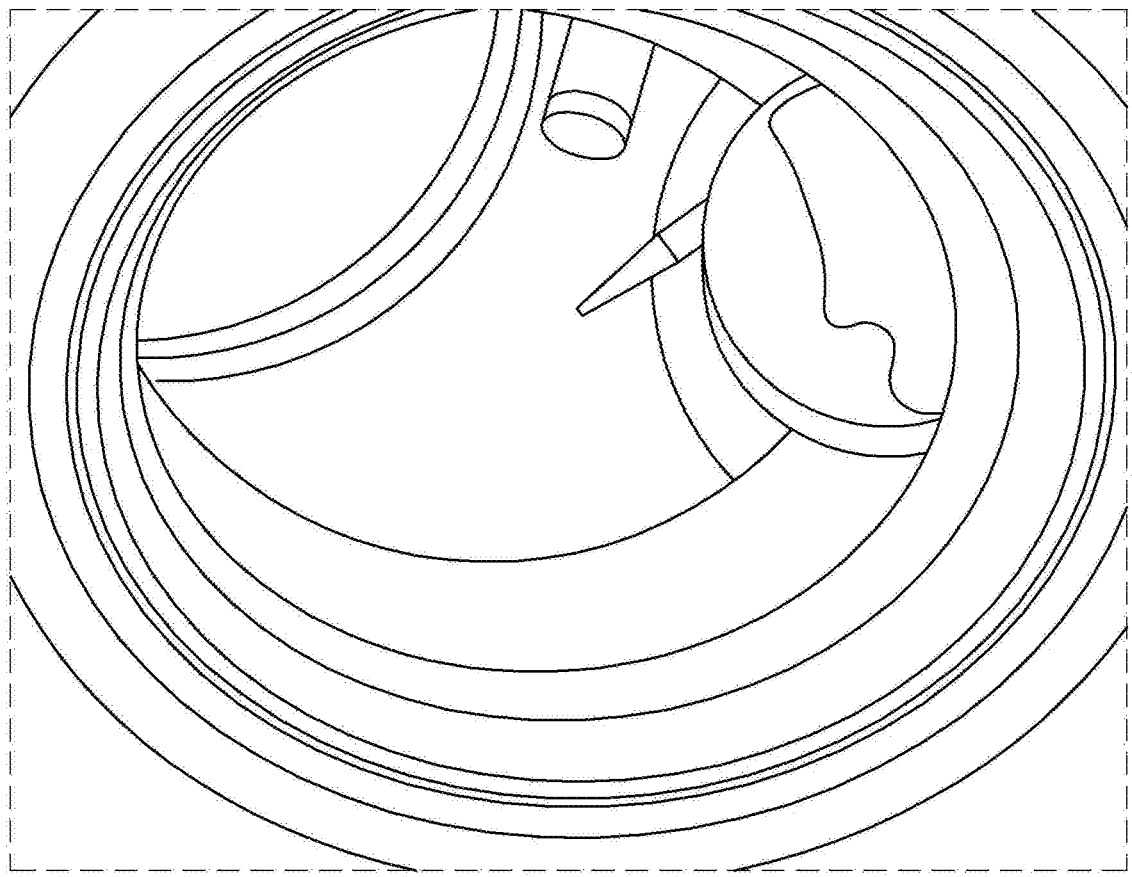
FIG. 21 illustrates a state in which the $NO_x$ sensor screening device of embodiments of the present invention is added to the front end of the tail pipe.
Figure 22:
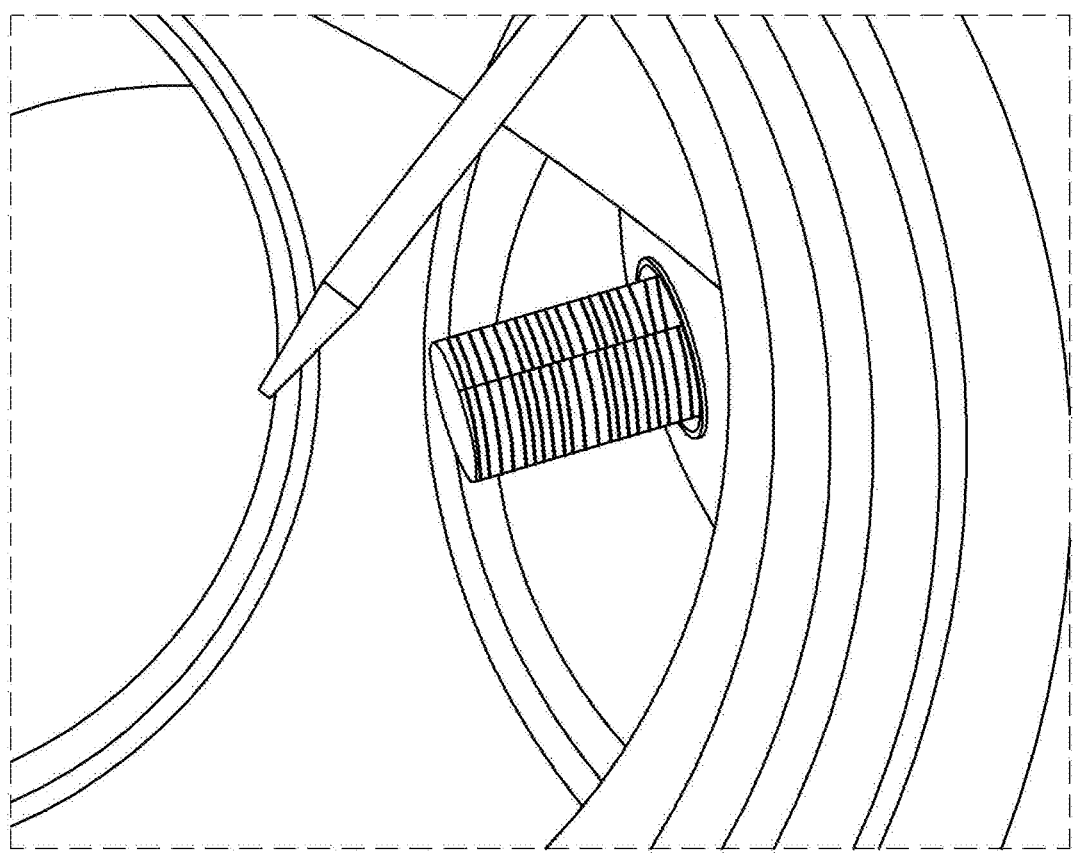
FIG. 22 illustrates the $NO_x$ sensor after a test target vehicle is washed by a wheel washer.

FIG. 21 illustrates a state after the NO), sensor screening device of embodiments of the present invention is added to the front end of the tail pipe. For the convenience of manufacture, the $NO_x$ sensor screening device is secured to the front end of the tail pipe by welding. FIG. 22 illustrates the $NO_x$ sensor after a test target vehicle is washed by a wheel washer. Referring to FIGS. 21 and 22, since there is no trace of water contact with the litmus paper surrounding the $NO_x$ sensor, it can be considered that the embodiments of the present invention can prevent water from flowing into the $NO_x$ sensor.

Although the present invention was described with reference to specific embodiments shown in the drawings, it will be understood by those skilled in the art that the present invention may be changed in various ways without departing from the scope of the present invention. Therefore, the scope of the invention should not be limited to the above-described embodiments, and all changes that fall within bounds of the claims or equivalence of such bounds are intended to be embraced by the claims.

What is claimed is:

1. A device for screening a NOx sensor provided on a front end of a tail pipe, the device comprising:
   a screen;
   a screen rotating shaft to which the screen is fixed, the screen rotating shaft having a screen lever;
   a first fixed shaft having a second end that is coupled to or separated from a first end of the screen rotating shaft, and an axial side extension part with a temperature sensitive length extension and contraction part that is opposite to the screen lever, wherein each of the first end and the second end is inclined to a side;
   a second fixed shaft having a return spring that is configured to be compressed by the screen rotating shaft or to push the screen rotating shaft;
   a rotary stopper coupled to the screen rotating shaft; and
   a first fixing plate located inside the front end of the tail pipe and deformed to fix the rotary stopper from passing in one direction and to pass the fixed rotary stopper in an opposite direction.

2. The device of claim 1, wherein the temperature sensitive length extension and contraction part is a bimetal.

3. The device of claim 2, wherein the temperature sensitive length extension and contraction part is a coiled bimetal.

4. The device of claim 1, wherein the rotary stopper is hinged to a coupling part formed on the screen rotating shaft.

5. The device of claim 4, wherein the rotary stopper comprises a coupling end coupled to the coupling part and a contact end coming into contact with the first fixing plate, and the contact end comprises an end formed as a chamfer.

6. The device of claim 5, further comprising a torsion spring provided on a side surface of the coupling end.

7. The device of claim 5, further comprising a second fixing plate provided on a front surface of the rotary stopper.

8. The device of claim 1, wherein deformation of the first fixing plate is thermal deformation due to a change in temperature.

9. The device of claim 8, wherein the thermal deformation is bending of the first fixing plate.

10. The device of claim 8, wherein the thermal deformation is configured to occur when a DPF recycling is terminated or an engine load is reduced.

11. The device of claim 1, wherein the first fixing plate is configured to pass through the front end of the tail pipe to be positioned inside or outside the front end of the tail pipe, and is integrated therewith.

12. The device of claim 11, wherein the first fixing plate is configured to be thermally deformed when water comes into contact with the first fixing plate positioned outside the front end of the tail pipe.

13. The device of claim 1, wherein the first fixing plate is a bimetal.

14. The device of claim 13, wherein the first fixing plate is a plate-shaped bimetal.

15. The device of claim 1, wherein the screen lever comprises a flange that is coupled to the screen rotating shaft, and a third end that is hinged to the flange and is opposite to the temperature sensitive length extension and contraction part, wherein a hinge line does not correspond to a length extending direction of the temperature sensitive length extension and contraction pall.

16. The device of claim 15, wherein the hinge line is perpendicular to the length extending direction of the temperature sensitive length extension and contraction part.

17. The device of claim 1, wherein the screen is parallel to an exhaust-gas flow direction, when the screen rotating shaft is separated from the first fixed shaft.

18. The device of claim 1, wherein the screen rotating shaft and the first fixed shaft are separated from each other when a DPF is recycled or an engine load is increased.

19. The device of claim 1, wherein the screen is perpendicular to an exhaust-gas flow direction, when the screen rotating shaft is coupled to the first fixed shaft.

20. The device of claim 1, wherein, when a vehicle-start is off, when a vehicle is in an idle state, when a DPF recycling is terminated, when an engine load is reduced, or when water comes into contact with the first fixing plate extending to an outside of the front end of the tail pipe, the screen rotating shaft is coupled to the first fixed shaft.

* * * * *